UNITED STATES PATENT OFFICE.

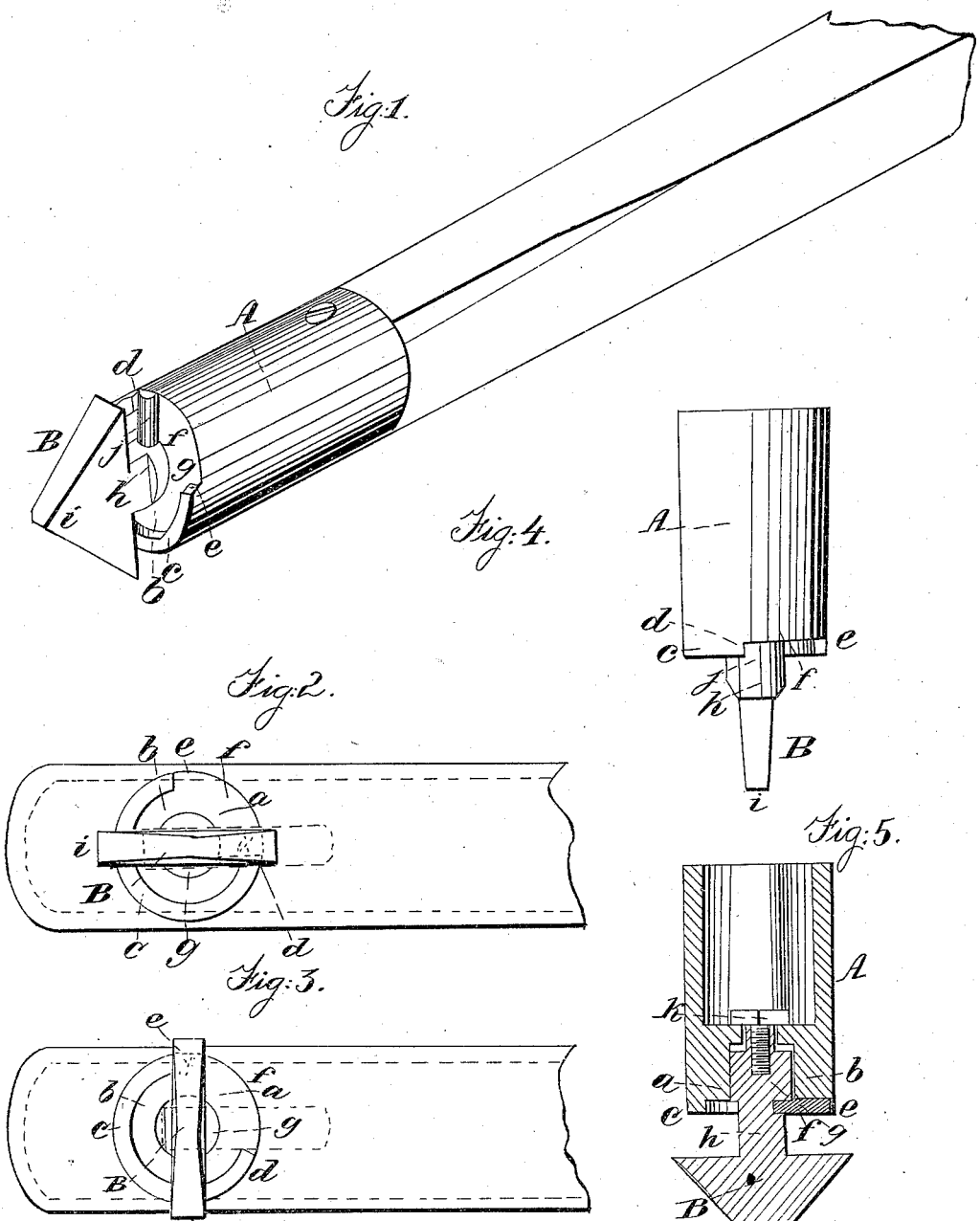

WILLIAM M. BRYANT, OF WASHINGTON, DISTRICT OF COLUMBIA, ASSIGNOR TO HIMSELF, JOHN B. WHEELER, AND JOHN R. ELVANS, OF SAME PLACE.

IMPROVEMENT IN WHIFFLETREE-IRONS.

Specification forming part of Letters Patent No. 47,894, dated May 23, 1865.

*To all whom it may concern:*

Be it known that I, WILLIAM M. BRYANT, of the city and county of Washington, and District of Columbia, have invented a new and useful Improvement in Fastenings for the Traces of Carriage and Wagon Harness; and I do hereby declare that the following is a full, clear, and exact description of the same, reference being had to the accompanying drawings, forming part of this specification, in which—

Figure 1 is a perspective view, showing the trace-fastening applied to a whiffle or swingle tree. Fig. 2 is an end view of the fastening in condition for receiving the trace upon it. The red lines show the trace. Fig. 3 is a similar view of the fastening, but as it appears when the trace is confined upon it. Fig. 4 is a top view of the fastening as shown in Fig. 3. Fig. 5 is a horizontal section of the fastening as shown in Fig. 2.

Similar letters of reference in the several figures indicate corresponding parts.

The nature of my invention consists, first, in constructing whiffle and swingle tree ferrules with a shouldered stem, which is cylindric for a portion of its length and oblong or dart or T-shaped for the remainder thereof, the oblong portion being much broader than the diameter of the cylindric portion, in combination with an inclined surface and two shoulders or stops, and with a locking-pin, all in such a manner that the broad portion of the stem can be turned round to a position which will permit it to enter the slot or eye of a trace, and, after it has passed through the said eye, may be turned back and round to a position at right angles to the length of the slot or eye, and in that position fastened securely by means of frictional bind between the above-mentioned inclined surface and the locking-pin, as will be hereinafter described.

My invention consists, second, in providing a screw-adjusting contrivance, in combination with the above-described trace-fastening, in such manner that the locking-pin may be drawn up close to the inclined surface of the ferrule at such times as wear from use may render necessary.

With my invention, the use of a spring is rendered unneccessary in trace-fastenings, which are constructed so as to be adjusted to a position which will admit of them passing through the slots of the traces and then to spring back and round to a position at right angles to the length of the slots, and thus the inconvenience resulting from the liability of the spring getting out of order and not operating perfectly and readily is avoided.

My invention affords the greatest facility for detaching the traces from the swingle or whiffletrees in cases of accident or necessity; but at the same time, it is perfectly secure against accidental detachment of the traces, as the forward strain of the traces upon the stems of the ferrules tends to fasten the locking-pins more firmly. As there is no back strain, from the fact of the slots of the traces being quite long, there will be no chance for the stems to turn backward; but to afford further security against accidental detachment from frictional contact or back movement of the traces, those portions of the stems upon which the traces play directly may be made with flat surfaces at top and bottom, and thus cause the back strain to be equal above and below the axes of the stems.

To enable others skilled in the art to make and use my invention, I will proceed to describe the same with reference to the drawings.

A is a metal ferrule to be fitted (one) to each end of a whiffle or swingle tree. This ferrule has its outer end closed, except that a circular eye or hole, *a*, is formed through the center of the cap or head *b*, which closes it.

From the outer face of the closing head *b* and at the circumference of the ferrule, a narrow circular flange, *c*, extends longitudinally and circumferentially, as represented. This flange extends circumferentially about three-quarters of a circle and then terminates in stop-shoulders *d e*, the shoulder *d* being at a point in line with the horizontal axis of the ferrule, and the shoulder *e* at a point in line with the vertical axis of the ferrule, as illustrated. Between these two stop-shoulders the end-closing head is formed with an incline or bevel, *f*, as illustrated in the drawings.

B is the metal stem upon which the trace plays. This stem is represented as being formed with a cylindric portion, *g*, a flat or square portion, *h*, and a dart or spear-shaped portion, *i*. It also is shown with a pin, *j*, extending from the portion *g* to the circumference of the ferrule. This stem, B, in order to be fitted to the ferrule, is adjusted so that the pin *j* comes between the two shoulders *d e*, and then its cylindric portion is inserted into the eye or central hole, *a*, of the ferrule and fastened therein by means of a screw, *k*, as represented. This fastening-screw *k* is so applied that it holds the parts together, but does not prevent the stem B from being turned the distance which the stops *d e* are apart. Instead of this screw-fastening *k*, a short screw-thread may be formed on the circumference of an extension of the part *g*, and a common nut be used to hold the parts together.

When the parts have been properly fitted together, the pin *j* will work loosely upon the end *b* of the ferrule for about half the distance of the space between the stops *d e*, and then will begin to work against said head or end *b* with a gradually-increasing bind or friction until it strikes the stop *e*, at which point the bite or frictional contact is so great that considerable force with the hand will be necessary to move it back to the shoulder *d*. In case the bind between the parts is not sufficient the ferrule is removed from the whiffle or swingle tree and a slight turn given to the screw *k*, so as to draw the pin *j* nearer to the end *b* of the ferrule. The frictional contact and bind results from the pin *j* rising upon or against the incline *f* of the ferrule.

From the drawings it will be evident that when the dart-shaped portion *i* of the stem is adjusted to the position shown in Fig. 2, the trace can be readily slipped over it and upon the intermediate portion, *h*; also, that when the said dart-shaped portion is adjusted to the position shown in Fig. 3, the trace will be confined and cannot get off of the stem until the stem is again turned to the position shown in Fig. 2.

What I claim as my invention, and desire to secure by Letters Patent, is—

1. Constructing the ferrule A for swingle or whiffletrees with the stops or shoulders *d e* and inclined or bevel *f*, substantially in the manner and for the purpose described.

2. In combination with the subject-matter of the first clause of my claim, the turning stem B, with its locking-pin *j*, substantially as described.

3. In combination with the subject-matter of my first and second clauses of claim, the screw-fastening *k*, substantially as herein described.

WM. M. BRYANT.

Witnesses:
JOHN B. WHEELER,
JNO. S. HOLLINGSHEAD.